United States Patent
Kosunen et al.

(10) Patent No.: US 7,257,609 B1
(45) Date of Patent: Aug. 14, 2007

(54) MULTIPLIER AND SHIFT DEVICE USING SIGNED DIGIT REPRESENTATION

(75) Inventors: Marko Kosunen, Helsinki (FI); Kari Halonen, Helsinki (FI)

(73) Assignee: Nokia Corporation, Espoo (FI)

( * ) Notice: Subject to any disclaimer, the term of this patent is extended or adjusted under 35 U.S.C. 154(b) by 665 days.

(21) Appl. No.: 10/399,178

(22) PCT Filed: Oct. 16, 2000

(86) PCT No.: PCT/EP00/10166

§ 371 (c)(1),
(2), (4) Date: Oct. 23, 2003

(87) PCT Pub. No.: WO02/33537

PCT Pub. Date: Apr. 25, 2002

(51) Int. Cl.
*G06F 15/00* (2006.01)
*G06F 7/52* (2006.01)

(52) U.S. Cl. .................................. 708/493; 708/420
(58) Field of Classification Search ............. 708/493, 708/620
See application file for complete search history.

(56) References Cited

U.S. PATENT DOCUMENTS

| | | | |
|---|---|---|---|
| 4,546,446 A | 10/1985 | Machida | |
| 4,947,364 A | 8/1990 | Mahon et al. | |
| 4,967,388 A | 10/1990 | Tate | |
| 5,253,195 A | 10/1993 | Broker et al. | |
| 5,262,974 A | 11/1993 | Hausman et al. | |
| 5,465,222 A | 11/1995 | Seckora | |
| 5,483,477 A | 1/1996 | Sato et al. | |
| 5,978,822 A | 11/1999 | Muwafi et al. | |
| 6,590,931 B1* | 7/2003 | Wittig | 375/231 |
| 2003/0220956 A1* | 11/2003 | Parhi et al. | 708/620 |
| 2004/0170223 A1* | 9/2004 | Chiueh et al. | 375/229 |

OTHER PUBLICATIONS

K. Parhi, A Systematic Approach For Design Of Digit-Serial Signal Processing Architectures, IEEE Transactions On Circuits And Systems, vol. 38, No. 4, Apr. 1991, pp. 358-375.

Oh et al., Implementation of Programmable Multiplierless FIR Filters With Powers-of-Two Coefficients, IEEE Transactions On Circuits And Systems-II: Analog and Digital Signal Processing, vol. 42, No. 8, Aug. 1995, pp. 553-558.

(Continued)

*Primary Examiner*—Chuong D. Ngo
(74) *Attorney, Agent, or Firm*—Foley & Lardner LLP

(57) ABSTRACT

The present invention proposes a multiplier device performing multiplication of different powers of two serially in time (not in parallel) in order to further reduce the area needed for a hardware realization. By virtue thereof, it is enabled to use only one adder in connection with the multiplication which contributes to a reduced hardware amount and reduced required area for the hardware. A shifter means based on binary weighted shifting is used for shifting in connection with the multiplication, thereby reducing the required hardware amount (number of multiplexers and hardwired shifting elements) and thus reducing the area for hardware implementation still further. The present invention can be used in applications using digital multiplication, such as in digital signal processing DSP, digital filters and/or finite impulse response filters FIR filters as well as programmable and/or adaptive digital filters. As the multiplier is represented in CSD coding, the number of necessary shifting operations can be reduced and the number of necessary additions can be reduced, thus contributing to a reduced area needed for a hardware realization of a shifting means and a multiplier device on a silicon chip.

6 Claims, 5 Drawing Sheets

OTHER PUBLICATIONS

Duan, et al., Versatile Beamforming ASIC Architecture For Broadband Fixed Wireless Access, IEEE 1999 Custom Integrated Circuits Conference; Electrical Engineering Department, University of California, Los Angeles, pp. 545-548.

Duan, et al., A Highly Versatile Beamforming ASIC for Application in Broad-Band Fixed Wireless Access System, IEEE Journal of Solid-State Circuits, vol. 35, No. 3, Mar. 2000, pp. 391-400.

Khoo, et al., A Programmable FIR Digital Filter Using CSD Coefficients, IEEE Journal of Solid-State Circuits, vol. 32, No. 6, Jun. 1996, pp. 869-874.

Chang, et al., Systematic Design Of High-Speed and Low-Power Digit-Serial Multipliers, IEEE Transactions On Circuits And Systems-II: Analog and Digital and Signal Processing, vol. 45, No. 12, Dec. 1998, pp. 1585-1596.

\* cited by examiner

MULTIPLIER AND SHIFT DEVICE USING SIGNED DIGIT REPRESENTATION

BACKGROUND OF THE INVENTION

1. Field of the Invention

The present invention relates to a multiplier device and to a shifter.

2. Description of the Prior Art

With the spreading of digital signal processing, a need for multiplier devices which multiply digital signals has arisen.

Conventionally, when multiplying two digital signals each of which representing a number value, the multiplication is performed as follows. Assume A to represent the multiplicand and B to represent the multiplier, and assume further, for example only, that A and B, respectively, are in a 4 bit representation (generally, a n-bit representation) (a bit being also referred to as digit).

For multiplying (in decimal system) A=11 by B=7 (which yields 77 in decimal notation), the following has to be effected if A, B are binary signals.

For each bit of the multiplier, the value of the multiplicand is to be shifted by a number of bits, which number of bits corresponds to the significance of the bit of the multiplier. That is, for the least significant bit (representing $2^0$), a zero shift of the multiplicand has to be effected, while for the most significant bit out of n bits (representing $2^{n-1}$), a shift by (n−1) bits has to be effected. Also, as shown below, the thus shifted multiplicand values will have to be added to form the result.

```
A         *    B         =    C
11(D) *        7(D)      =    77(D)
1011(B) *      0111(B)   =
               1011
               10110
               101100
               0000000
               1001101   (B)  = 1001101(B)
```

Stated in other words, the multiplier bits serve to control the respective shifting (which corresponds to a multiplication by a respective power of two in binary representation) of the multiplicand, and the shifted multiplicands are to be added.

In the field of digital signal processing, for example in the field of digital filtering, binary data are also represented as Sum-Of-Powers-Of-Two (SOPOT). A number represented with Sum-Of-Powers-Of-Two (SOPOT) can be a Canonic Signed Digit (CSD), in order to perform the multiplications needed for example in filtering operations. Other Sum-Of-Powers-Of-Two (SOPOT) representations can be the signed digit (SD) representations, the Minimum Signed Digit (MSD) representation, which are explained herein below.

In Canonic Signed Digit code, values of 1, 0, and −1 are used as digits to represent the value, whereas the binary code uses only 0 and 1. In an ordinary binary number, the average number of non-zero digits is larger than in CSD coded numbers, so that the CSD coded number has a minimum of non-zero terms.

For example, the following table shows a correspondence between a binary coded number of n=4 bits (the example represents values of 0 to 15) and the corresponding CSD coded number. Correspondences of decimal numbers 16 and 17 for binary and CSD representation are also shown.

| Decimal | Binary | CSD |
|---|---|---|
| 0 | 0000 | 00000 |
| 1 | 0001 | 00001 |
| 2 | 0010 | 00010 |
| 3(= 4 − 1) | 0011 | 0010-1 |
| 4 | 0100 | 00100 |
| 5 | 0101 | 00101 |
| 6(= 8 − 2) | 0110 | 010-10 |
| 7(= 8 − 1) | 0111 | 0100-1 |
| 8 | 1000 | 01000 |
| 9 | 1001 | 01001 |
| 10 | 1010 | 01010 |
| 11(= 16 − 4 − 1) | 1011 | 10-10-1 |
| 12(= 16 − 4) | 1100 | 10-100 |
| 13(= 16 − 4 + 1) | 1101 | 10-101 |
| 14(= 16 − 2) | 1110 | 100-10 |
| 15(= 16 − 1) | 1111 | 1000-1 |
| 16 | 10000 | 10000 |
| 17 | 10001 | 10001 |
| ... | | |
| etc. | | |

In a case of negative binary numbers, this example may be different. It should be kept in mind that with CSD code representation, the number is only approximated. Apparently, as derivable from the above example, when using CSD representation, with a maximum number of non-zero bits, the decimal numbers may be represented.

Generally, in CSD coded numbers, no non-zero terms can be placed adjacent to each other, so that a terms of 1 and/or −1 are always to be spaced by a term of 0.

Also, the above example was given with reference to positive integer values only. Generally, a CSD presentation of any number (X) can be given by representing the number in sums and differences of powers of two as follows:

$$X = \sum_{i=-\infty}^{i=+\infty} g_i * 2^i, \text{ with } g_i \in \{-1, 0, 1\}$$

Thus, the above example has been chosen such that only positive values of i are used.

The number of additions (NA) needed in a multiplication is then NA=(L−1), wherein L is the number of non-zero terms in the CSD presentation.

For the decimal value of "7", with CSD code representation in comparison to binary representation, the number of non-zero terms is reduced from three to two, while also, the number of necessary shift operations is reduced (from two shifts for the middle two bits in binary representation to only one shift operation for the most significant bit in CSD representation, since for the least significant bit, no shifting is required (shift by zero).)

Thus, referring back to the above example of multiplying A*B (11*7), this corresponds to the subtraction of "one times A" from "eight times A" when using CSD representation of the multiplier. A subtraction, however, corresponds to the addition of the 2's complement of the value to be subtracted. (The 2's complement is formed by inverting each bit of the value to be subtracted (1's complement) and then adding just binary "1" thereto.)

Thus, when making use of the CSD representation, a multiplier device which is a part in digital designs, which part consumes the most area on a semiconductor device chip, is replaced by a certain number of adders. The number of adders is dependent on the accuracy of the presentation of the multiplier which in turn is dependent on the number of non-zero terms in the CSD code representation.

The multiplication by a power of two (i.e. $2^0, 2^1, \ldots, 2^n$) is usually performed by shifting the multiplicand (in binary and/or 2's complement) format either to the left by a corresponding number of bits (as explained above) for multiplication, or to the right in case of division.

Generally, a number that is represented with Sum-Of-Powers-Of-Two (SOPOT) is represented in a so-called Signed Digit representation wherein the sign of the different power of two can have a value out of the set of values 1, 0, −1. Minimum Signed Digit (MSD) representation is the format, in which the number is represented with a minimum number of non-zero terms. There can be many different MSD representations of a same number. Canonic Signed Digit (CSD) representation is always one of the possibilities of MSD representation, while CSD is the format, in which there is a restriction such that the occurrence of adjacent non-zero signals is not allowed (thus, there are no adjacent non-zero digits in CSD representation). For example, assume a number of decimal "3", which can be represented in

| SD | MSD | CSD | as follows: |
|---|---|---|---|
| 1-1-11 | 0011 | 010-1 | |
| 1-10-1 | 010-1 | | |
| 0011 | | | |
| 010-1 | | | |

In cases, in which the multiplier has a fixed value and is thus known beforehand, the shifts can be realized by wiring and without any extra hardware (logic circuits).

However, this limits the applicability of the multiplier device to multiplications by only the fixed multiplier value.

For increasing a field of applicability of a multiplier to variable multiplier values, arrangements have been conceived, according to which the shift amounts can be altered.

FIG. 1 shows a prior art arrangement of a shifting means usable in a multiplier device. The shifting means effects variable shift amounts for variable control signals, for example in a binary and/or CSD representation. A control signal can be a multiplier in case of applying the shifter in a multiplier device. At least, the control signal is derivable from the multiplier.

As shown in FIG. 1, the multiplicand denoted by X is supplied to the shifting means. The multiplicand is branched, with the number of branches corresponding to the number of bits of the multiplier (not shown as a separate signal (control signal) in FIG. 1). As shown in FIG. 1, the multiplicand X is branched to eight branches, with a respective branch of the multiplicand's signal X (duplicate of X) being subjected to a respective fixed shift of a value between zero and seven. The shifting is performed by a shifting element (not shown) realized by a wiring which shifts the supplied signal X by the provisioned (predetermined) shift amount.

A respective pair of shifted values of the signal X is supplied to a first stage of multiplexers MUX (2:1 multiplexer). One of the shifted signals is selected by a control signal (not shown) supplied to the multiplexer.

Each output of one of the first stage multiplexers is supplied to a respective multiplexer of a second stage of multiplexers MUX (2:1 multiplexers). Since the multiplexers are 2:1 multiplexers in the example of FIG. 1, respective two output signals of a first stage are supplied to a multiplexer of the second stage. One of the input signals to a respective second stage multiplexer is selected by a control signal (not shown) supplied to the multiplexer.

Each output of one of the second stage multiplexers is supplied to a multiplexer of a third stage of multiplexers MUX (2:1 multiplexers). One of the input signals to a respective third stage multiplexer is selected by a control signal (not shown) supplied to the multiplexer to be output (labeled Y in FIG. 1). Note that as shown in FIG. 1, the third stage of multiplexers contains a single multiplexer only.

As the control signal for controlling the multiplexers of the first through third stage, either the bits of the multiplier are directly used or the control signal bits are derived from the bits of the multiplier, and applied thereto in a manner such that the multiplicand X is shifted by a value corresponding to the significance of a respective bit of the multiplier being currently processed. Stated in other words, assuming that a first bit has the significance of zero (least significant bit LSB) and an eighth bit has a significance of seven (most significant bit MSB), then if the bit no. 5 of the multiplier is processed, this fifth bit has a significance of "four". Hence, the multiplexer stages are controlled such that at the output Y of the shifting means the signal X shifted by an mount of four bits is output.

Apparently, such a shifting means as shown in FIG. 1 requires numerous logic circuits and multiplexer devices for realizing a desired shift amount.

Still further, for effecting multiplication operations, such shifted values of the multiplicand have to be added, as explained above with reference to the example of the multiplication operation.

FIG. 2 of the drawings shows an arrangement of adders for summing those shifted values. In the example shown, in order to keep the drawing simple, it has been assumed that the multiplier is only a four bit multiplier.

Thus, the multiplicand X is supplied to four shifting means "Shifter". Each shifting means may be constituted and subjected to a control by the multiplier as described with reference to FIG. 1.

At the output of the shifting means, respective outputs Y0, Y1, Y2, and Y3 are output which denote signal X shifted by zero (Y0), signal X shifted by one (Y1), signal X shifted by two (Y2), and signal X shifted by zero (Y3), respectively.

These shifting means output signals are grouped to pairs and supplied to respective adder means denoted by "+". The adder means are arranged to perform an addition in parallel since Y0 and Y1 are added by one of the adder means, while simultaneously Y2 and Y3 are added by another one of the adder means.

The thus obtained partial additions are supplied to a further adder means of a subsequent adder stage, are added and output as a final addition result (Z).

Thus, also such a multiplier device using parallel addition requires numerous adder means and numerous shifting means, that is a bulky hardware, in order to be suitable for performing the multiplication by a variable multiplier.

Further prior art is known, for example, from the publication "A Systematic Approach For Design Of Digit-Serial Signal Processing Architectures" by K. K. Parhi, in IEEE Transactions on Circuits and Systems, Vol. 38, No. 4, April 1991. This document presents a systematic unfolding technique to transform bit-serial architectures into equivalent digit-serial ones. However, in order to accomplish this goal, functionally correct control circuits have to be generated and implemented, thereby leading to an increased amount of (control) hardware.

W. J. Oh and Y. H. Lee present in their article "Implementation Of Programmable Multiplierless FIR Filters With Powers-Of-Two Coefficients" in IEEE Transactions On Circuits and Systems-II: Analog And Digital Signal Processing, Vol. 42, No. 8, August 1995, a possibility to implement shorter shifters. However, the arrangement of multiplier devices is not specifically concerned.

Duan, Ko, and Daneshrad discuss in their article "Versatile Beamforming ASIC Architecture For Broadband Fixed Wireless Access", in IEEE Custom Integrated Circuits Conference, 1999, that programmable CSD multiplication is usually implemented using shifters and multiplexers, while their examination of CSD properties revealed that as discussed by Oh, Lee cited above, the number of shifters and multiplexers can be reduced by dividing the shift operation into a pre-shift and hardwired shift, thereby resulting in further complexity reduction.

However, studies of the present inventors revealed that the achievable complexity reductions are still not optimum.

The same holds for the above authors' (Duan et al.) publication "A Highly Versatile Beamforming ASIC For Application In Broad-Band Fixed Wireless Access Systems" in IEEE Journal Of Solid-State Circuits, Vol. 35, No. 3, March 2000.

Khoo, Kwentus and Willson propose in "A Programmable FIR Digital Filter Using CSD Coefficients", in IEEE Journal of Solid-State Circuits, Vol. 31, No. 6, June 1996, a coefficient multiplier adopting a two-level transmission gate multiplexer network for selecting appropriate hardwired pre-shift data. This, however, causes considerable delay, which is suggested to be compensated by an (additional) pipeline register. This, however, does not support the complexity to be reduced to a minimum.

Several types of multipliers are presented by Chang, Satyanarayana and Parhi in "Systematic Design Of High-Speed and Low-Power Digit-Serial Multipliers", in IEEE Transactions On Circuits And Systems-II: Analog And Digital Signal Processing, Vol. 45, No. 12, December 1998. However, processing of a multiplier being represented in CSD format is not considered.

Also, a CSD multiplier device requiring still a considerable amount of silicon area is known from U.S. Pat. No. 4,967,388.

A further programmable CSD multiplier is disclosed in U.S. Pat. No. 5,262,974. However, several programmable shift paths and a corresponding plurality of adders are provided for summing these outputs. Hence, also this prior art arrangement requires quite a bulky hardware which consumes quite significant area when implemented on a silicon chip.

In summary, implementing flexibility to achieve multiplication by a variable multiplier requires additional hardware, i.e. logic circuits.

In consequence, such arrangements are quite bulky and consume lots of semiconductor chip area, which is undesired in view of the aim to miniaturize IC chip designs. Also, the costs for such devices increase with an increase in the consumed chip area.

SUMMARY OF THE INVENTION

In view of the above, the present invention provides a multiplier device and a shifter which are free from the above mentioned drawbacks and which enable a multiplier device and a shifter to be constituted with a minimum amount of hardware, thus consuming only a minimum area of semiconductor chip area.

Still further, the present invention provides a multiplier device operable with variable multiplier coefficients without using a huge amount of logic to control necessary shifts, in case the multiplier coefficient is represented in CSD format.

According to the present invention, a shifter, for shifting a multiple digit input signal (X) by a number of digits selectable in a range from zero to $2^B-1$, the shifter comprising a plurality of B shifting stages, each shifting stage comprising a multiplexer element (MUX), being controlled by an i-th component of a shifting amount control signal having a total of B components, for outputting, depending on a value of the i-th component of the shifter amount control signal, either a signal supplied directly to the multiplexer from a multiplexer of an (i−1)-th shifting stage, or a signal supplied to the multiplexer from a multiplexer of an (i−1)-th shifting stage via an i-th shifting element which subjects the signal supplied thereto to a shifting by $2^{i-1}$ digits.

A multiplier device, for multiplying a multiplicand (X) by a multiplier represented by multiple digits in accordance with the invention comprises: a storage for storing a number (L) of pieces of information corresponding to the multiple digits of the multiplier; a shifting (BWS) for shifting the multiplicand based on a piece of information in the storage, and an adder (+), wherein pieces of information in the storage means are sequentially read out and applied as a control signal to the shifter, and an output of the shifter (BWS) is added by the adder to an output of the adder obtained previously.

In particular, according to further developments of the shifter,
the multiple digit input signal (X) is a binary signal,
the signal (X) to be shifted is supplied to the first shifting stage and the shifted signal (Y) is output from the B-th shifting stage,
the maximum shifting amount of $2^B-1$ corresponds to the number of digits minus one (n−1) of a multiplier by which the input signal is to be multiplied,
the shifting elements are realized by a fixed wiring.

In particular, according to further developments of the multiplier device,
the multiplier is represented by canonic signed digits;
the number (L) of pieces of information corresponding to said multiple digits of the multiplier corresponds to the number of digits of the multiplier;
the number (L) of pieces of information corresponding to the multiple digits of the multiplier corresponds to the number of non-zero digits of the multiplier in CSD representation;
the pieces of information stored in the storage includes a shift control signal of B bits width which represents the value of the significance of the concerned digit of the multiplier; a sign-flag indicating whether the concerned digit of the multiplier has a value of +1 or −1, and a zero flag indicating whether the concerned digit of the multiplier has a value of zero or not;
the shifter is a shifter as defined herein above;
the multiplier device further comprises a signal processor which outputs a 2's complement of the multiplicand, and wherein the sign flag controls a multiplexer to output the multiplicand (X) or the 2's complement of the multiplicand (−X).

Thus, with the present invention being implemented, the following advantages can be obtained:

The present invention can be used in applications using digital multiplication, such as in digital signal processing DSP, digital filters and/or finite impulse response filters FIR filters as well as programmable and/or adaptive digital filters. As the multiplier is represented in CSD coding, the number of necessary shifting operations can be reduced and the number of necessary additions can be reduced, thus contributing to a reduced area needed for a hardware realization of a shifter and a multiplier device on a silicon chip.

The multiplication of different powers of two is performed serially in time (not in parallel) in order to further reduce the area needed for a hardware realization. By virtue thereof, it is enabled to use only one adder in connection with the multiplication which contributes to a reduced hardware amount and reduced required area for the hardware.

A shifter based on binary weighted shifting is used for shifting in connection with the multiplication, thereby reducing the required hardware amount (number of multiplexers and hardwired shifting elements) and thus reducing the area for hardware implementation still further.

As a parallel architecture of the adder has been abandoned and addition is serially performed, the multiplier device is operated at a higher operation frequency in order to maintain computing speed. However, the operation frequency is dependent on the accuracy of the multiplier. With the usage of multiple different operation frequencies it is possible to obtain coefficient dependent power consumption (as IC's realized e.g. in CMOS technology do not consume power when static signals are applied, but only during the period of signal changes.)

BRIEF DESCRIPTION OF THE DRAWINGS

The above features and advantages of the present invention will be more readily understood when read in conjunction with the accompanying drawings, in which.

DETAILED DESCRIPTION OF THE EMBODIMENTS OF THE INVENTION

Subsequently, embodiments of the present invention are described in detail with reference to the drawings.

One aspect of the present invention when reducing the hardware amount and thus area needed for a multiplier device is to minimize the hardware needed for a shifter.

Figure 1:
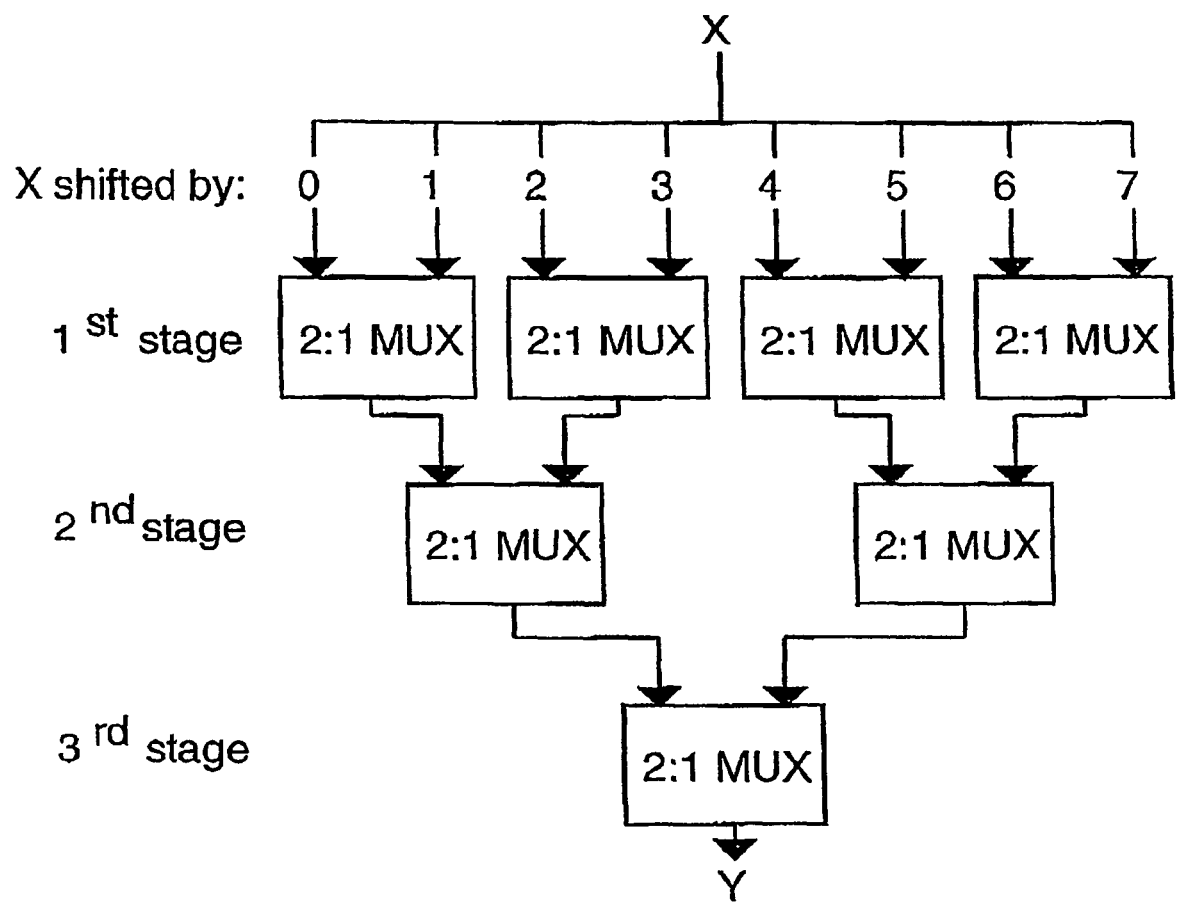
FIG. 1 illustrates a conventionally known shifting means usable in a multiplier device.
Figure 2:
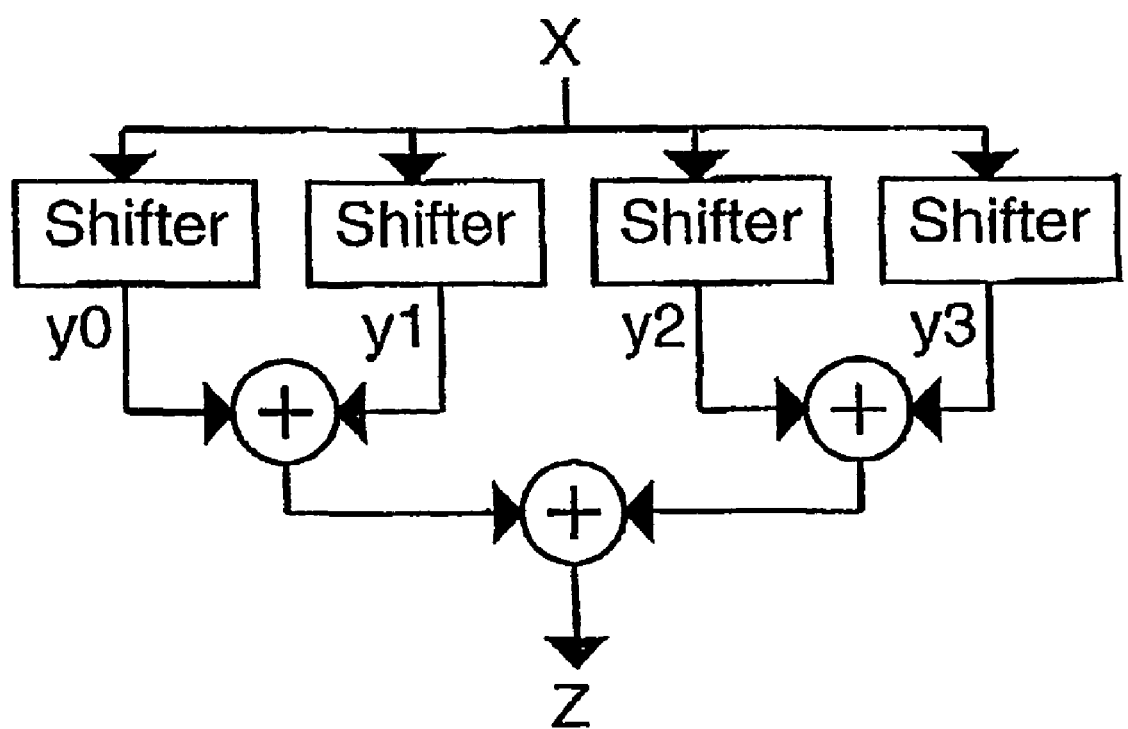
FIG. 2 depicts a conventionally known multiplier device with the parallel adder architecture.
Figure 3:
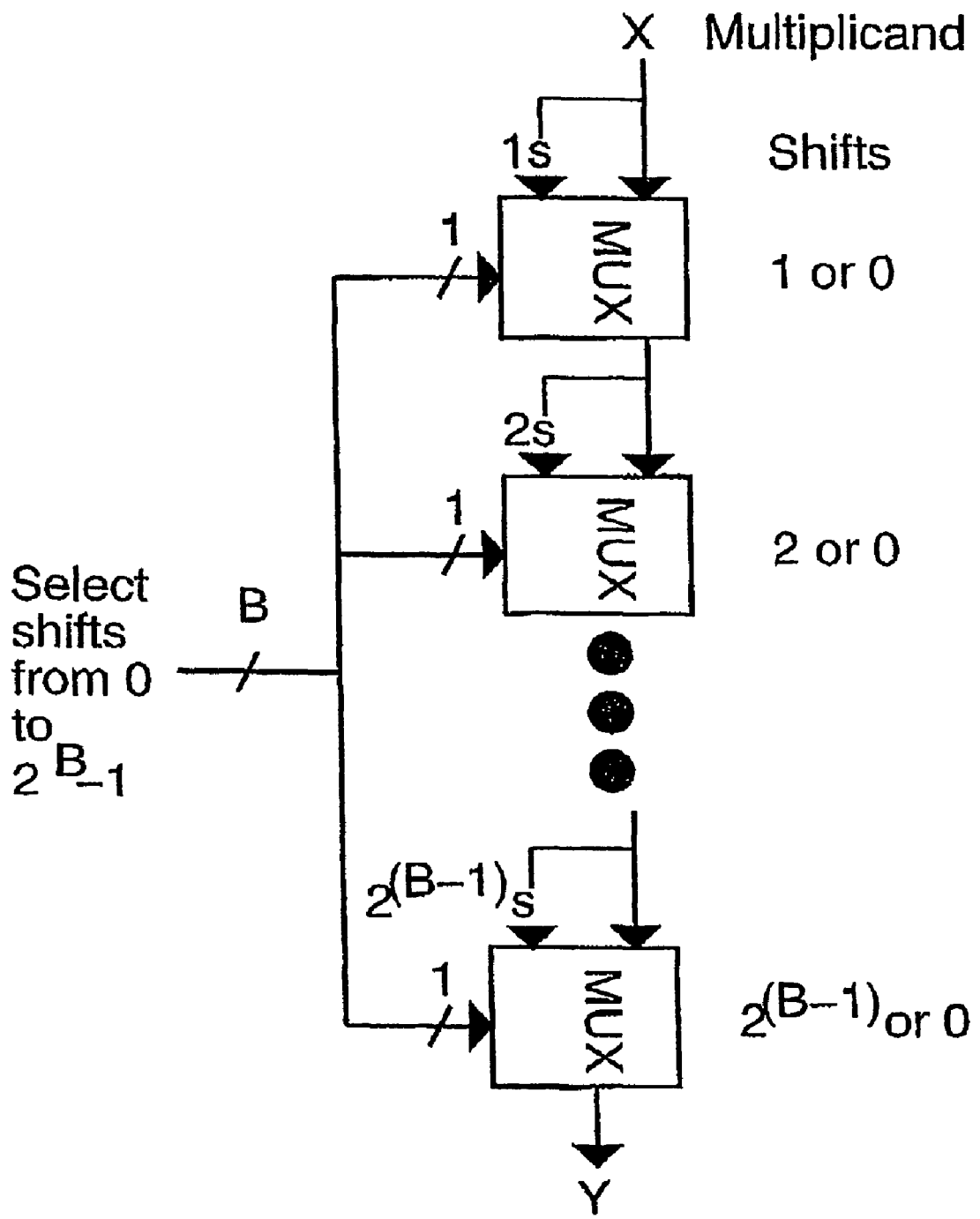
FIG. 3 shows a shifter according to the present invention.

According to the present invention, such a minimized shifter in terms of hardware is shown in FIG. 3.

Generally, the shifts are presented serially and each stage realizes two different shift values, i.e. 0 or $2^{(k-1)}$ with k being the index (number) of the stage and k reaching from 0 to B. B represents the maximum number of stages required and is linked to the bit number of the input signal (e.g. the multiplier if applied to a multiplier device) such that the input signal (multiplier) has $2^B$ bits. The shifts of each stage are thus binary weighted in relation to each other. With such a structure, any shift amount between zero and $2^B-1$ can be achieved, using B multiplexers only (generally, using $\log_2(2^B)$ multiplexers).

Now, the circuit arrangement shown in FIG. 3 is described in more detail.

A multiplicand X (generally in an n-bit representation) is supplied as an input signal to be processed to the shifter.

The signal X is branched in two branches. One branch is directly supplied to an input terminal of a multiplexer MUX of a first stage, while the other branch is passed through a shifting element (not shown in detail, only denoted by "1S") which shifting element subjects the branched signal X to a shift by 1 bit, before being supplied to another terminal of the multiplexer. Such a shifting element is normally realized by wiring. The branch of signal X directly fed to the multiplexer is not subjected to any shifting operation. A control signal of one bit width is supplied to the multiplexer of the first stage for selecting either the non-shifted signal X or the signal X shifted by one bit position to be output.

The output signal of the first stage (i.e.: X shifted by 0 or 1) is branched again in two branches. One branch thereof is supplied directly to an input terminal of a multiplexer MUX of a subsequent stage (second stage) without being subjected to a shift operation. The other branch is passed through a shifting element (not shown in detail, only denoted by "2S") which shifting element subjects the branched signal X to a shift by 2 bit, before being supplied to another terminal of the multiplexer. Such a shifting element is normally realized by wiring. Again, a control signal of one bit width is supplied to the multiplexer of the second stage for selecting either the non-shifted signal as supplied from the previous stage or the signal as supplied by the previous stage additionally shifted by two bit positions to be output.

The output signal of the second stage multiplexer is fed to a subsequent stage, which is constituted similar to the preceding stages. The only difference is that the shifting element of each stage performs a shift by an amount of $2^{k-1}$ bits, with k denoting the number of stages in the shifting element.

The control signals supplied to the individual stages together form a control signal bit vector or control word having a width of B bits.

The multiplexers are configured such that a control bit of "zero" indicates "no shift" in a respective stage, while a control bit of "one" indicates that a shift operation is to be performed by the respective stage.

In case the shifter is applied in a multiplier device, the maximum amount of shifting of the multiplicand (X) is determined by the multiplier. Thus, if the multiplier has a width of n=8 bits, shifts between 0 and 7 may become necessary. The number of control signals is then B=3, since $2^B=2^3=8$, and with B=3 bits, all numbers (i.e. shift amounts) between 0 and 7 can be represented.

Now, the operation of the circuit arrangement shown in FIG. 3 is described in more detail with reference to an example.

Assume B to be three and assume the value of the bit vector B to be "101" in binary and/or CSD notation. Then, the shifting element shown in FIG. 3 comprises only three stages of multiplexers, each stage being provided with a shifting element which realizes a shift amount of 1, 2, or 4, respectively. In case of B=101 (corresponding to decimal "5"), the first stage shifts X by one bit, the second stage does not subject the signal shifted by one bit to an additional shift, and the third stage introduces an additional shift by four bits. As a result, the signal X shifted by five bits is output at an output terminal Y of the shifting element. Thus, in such a case, X has been shifted by five bits for multiplication with bit number six of a multiplier (significance of "5")(assuming that a first bit (representing 20) has a significance of 0, i.e. the LSB).

Thus, the value represented by the bit vector of B bits width corresponds to the significance of a bit in the multiplier. More generally, a multiplier having $2^B$ bits and/or digits may be represented by a bit vector of B bits width in order to encode each $2^B$ bit positions of the multiplier. The direction of shift can be from a least significant bit LSB to a most significant bit MSB. However, the reference point of the shift can also be the MSB (then the shift means a division).

Accordingly, as has been described in detail herein above, FIG. 3 illustrates a shifter, for shifting a multiple digit input signal (X) by a number of digits selectable in a range from zero to $2^B-1$, the shifter comprising a plurality of B shifting stages, each shifting stage comprising a multiplexer element (MUX), being controlled by an i-th component of a shifter amount control signal having a total of B components, for outputting, depending on a value of the i-th component of said shifting amount control signal, either a signal supplied directly to the multiplexer from a multiplexer of an (i−1)-th shifting stage, or a signal supplied to the multiplexer from a multiplexer of an (i−1)-th shifting stage via an i-th shifting element which subjects the signal supplied thereto to a shifting by $2^{i-1}$ digits.

Figure 4:
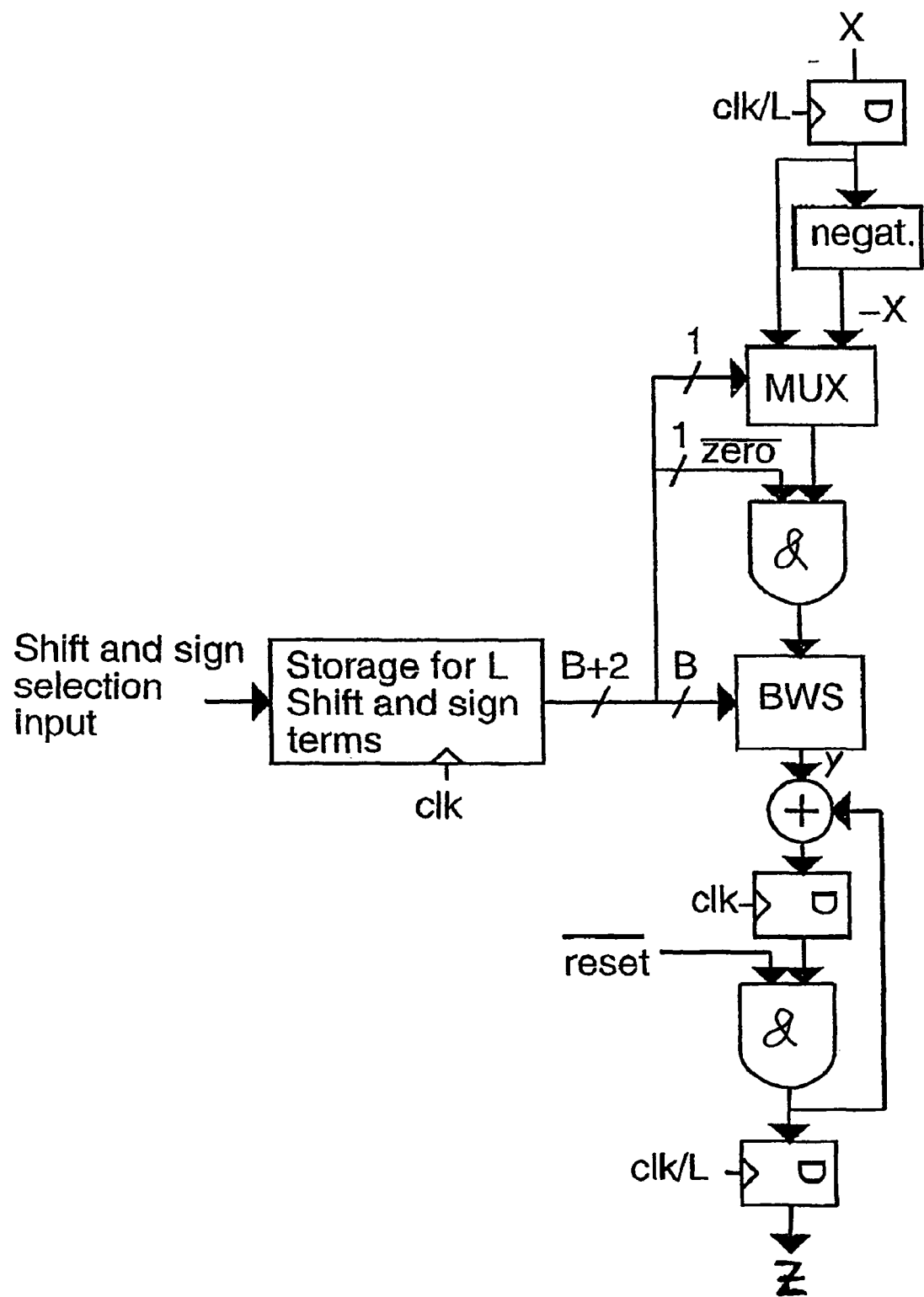
FIG. 4 shows a multiplier device according to the present invention.

Illustrated in FIG. 4, there is a multiplier device according to the present invention.

Generally, in the arrangement shown in FIG. 4, shifts and additions are performed serially. In the structure shown, there is only one shifting element (e.g. the one described with reference to FIG. 3), one adder, sign selection multiplexer zeroing stage and a storage register needed for multiplication. The amount of shifters, negators and zeroing logic is divided by L (with L being the maximum number of non-zero terms in a CSD representation of the multiplier).

Now, the circuit arrangement shown in FIG. 4 is described in more detail.

A multiplicand X is supplied to the multiplier device. More specifically, the multiplicand is supplied to a temporary storage means or latch means. Generally, the multiplicand is supplied to a register having a width sufficient to store the digits (bits) of the multiplicand therein. In FIG. 4, such a register is represented as a register based on D-flip-flops provided in parallel in a number corresponding to the width of the multiplicand (n bit). The D-flip-flop based register is controlled by a control signal clk/L (which is described later). Upon application of the control signal (level or edge sensitive), the multiplicand X is latched and stored for being processed (multiplied).

The output of the D-flip-flop based register is branched in two branches. One branch is directly supplied to an input terminal of a multiplexer MUX. The other branch is fed to a "NEGAT" means which is a processing means adapted to provide the 2's complement of the multiplicand X at ist output. This output is fed to another input of the multiplexer MUX. The multiplexer is a 2:1 multiplexer, which under control of a 1 bit control signal, outputs either X or −X (2's complement of X), at its own output.

The output of the multiplexer MUX is supplied to an input of an AND gate. To another input of the AND gate a signal "inverted zero" signal is supplied. Therefore, in case a "zero" signal ("zero-flag") indicates zero, this means that the signal zero assumes a value of one to indicate this state. Hence, the inverted zero signal assumes a value of zero. In consequence, the output of the AND gate assumes a value of zero. This invalidates any signal X, −X applied to the other input terminal of the AND gate. In case the zero signal does not indicate zero and assumes therefore a value of zero, the inverted zero signal assumes a value of 1, thus enabling that X or −X (whichever is applied to the other input terminal of the AND gate) is output unchanged from the AND gate.

It is to be understood that although the signal "inverted zero" is one bit only, whereas X, −X is generally n bit, the AND operation is performed for every bit of X, −X using the zero-flag.

The output of the AND gate is supplied as an input signal to a shifter (BWS). The shifter denoted by BWS is assumed to be a binary weighted shifter as described above in connection with FIG. 3.

However, other shifters are conceivable to be used, while, however, the reduction of hardware and required area is optimized if the shifter according to the present invention is used in combination with the multiplier device according to the present invention. Nevertheless, the shifter BWS may also be used in combination with other multiplier devices.

Thus, controlled by a shift control signal of B bit width, the shifter BWS shifts the signal supplied thereto (i.e. X or −X) by an amount of bits indicated by the value of B, which value corresponds to the significance of a bit of the multiplier currently processed for multiplication.

The control signal of B bit width of the shifter BWS, the zero-flag of one bit width and the control signal for controlling the multiplexer are supplied to the respective components of the multiplier device from a storage which stores therein L shift and sign terms. These terms are related to the value indicated by the multiplier in a manner as will be described later.

The shifted signal output from the shifter BWS is supplied to one input terminal of an adder labeled "+". An initial value applied to the adder (having two input terminals) is zero.

The initial value is obtained by applying a reset signal to the multiplier device (if a reset is to be performed, the signal RESET=1), such that a inverted reset signal assumes a value of zero. This value of zero of the inverted reset signal is applied to an input terminal of a second AND gate, which results in the output of the AND gate being zero irrespective of any other signal applied to another input terminal of the AND gate. The thus zeroed output of the AND gate is coupled back (feedback loop) to another (the second) input of the adder.

The output of the adder is applied to a second D-flip-flop based register which is controlled by a clock signal CLK. Thus, with each clock signal, the output of the adder is applied to the AND gate, and if no reset is to be effected, is fed back to the adder for a subsequent adding operation, thereby realizing a serial addition operation.

After the number of additions necessary for effecting the multiplication have been carried out, the final addition result is output via a third D-flip-flop based register as an output signal Z. The third output signal is controlled by a control signal CLK/L.

As mentioned above, the storage which stores therein L shift and sign terms will now be described.

The terms to be stored are obtained by mapping the multiplier value to obtain the shift and sign selection terms using a mapping means (not shown). The functionality of this mapping means is now explained with reference to an example.

Assume the case that X (multiplicand) is to be multiplied by a multiplier of a value of decimal 15(=16−1) which corresponds to binary 1111, while in CSD can be expressed by 1000−1.

Thus, if a multiplication by binary 1111 would have to be effected, three shift operations for bits of significance 1, 2, 3 would have to be effected, and also three additions would have to be effected.

When using a CSD representation of the multiplier, as seen in the example above, only one shift operation is effected (shift by 4 bits) as the MSB in the multiplier in CSD representation has a significance of 4 (the LSB does not require a shift operation as the shift would be zero). Also, only one addition is effected to add the non-shifted multiplicand (i.e. the 2's complement thereof, −X) to the multiplicand X shifted by 4 bit.

Thus, this information is mapped to the shift and sign selection terms. The number of terms is fixed for a given hardware and is selected such that the maximum number of non-zero terms in the CSD representation of the multiplier can be handled. For example, if it is known beforehand that the multiplier is in the range between 1 and 17, at most three non-zero terms in a CSD representation are necessary. Thus, in such a case, L=3 shift and sign terms are sufficient.

Now, mapping CSD "1000-1" (D"15") to three sign and shift terms yields (when e.g. beginning with the LSB of the multiplier):

A) first shift and sign term: (−1)

multiplexer control signal, "sign" (1 bit) is set such that the 2's complement of the multilpicand X is selected to be output by the multiplexer MUX, "zero-flag" is set to "0" (indicating that the value of the multiplier's LSB is not zero, i.e. assumes +1 or −1), shift control signal of B bits width represents the value of the significance of the concerned bit, here: LSB, and is thus set to zero (so B=000)

B) second shift and sign term: (0)

multiplexer control signal, "sign" (1 bit) setting is not important ("don't care"), "zero-flag" is set to "1" (indicating that the value of the multiplier's bit of significance "1" is zero), shift control signal of B bits width is not important since terms of value zero in the multiplier are not shifted as they do not contribute to the final result.

Note that in case of mapping the multiplier in sequential order, in the given example, the third shift and sign term may temporarily assume the same values as the second if mapping/analyzing the bits of significance "2" and "3". However, when processing the MSB (significance "4"), the latest values in the third shift and sign term will be overwritten by the following values:

C) third shift and sign term: (1)

multiplexer control signal, "sign" (1 bit) is set such that the multilpicand X is selected to be output by the multiplexer MUX, "zero-flag" is set to "0" (indicating that the value of the multiplier's MSB is not zero, i.e. assumes +1 or −1), shift control signal of B bits width represents the value of the significance of the concerned bit, here: MSB, and is thus set to "four" (so B=100).

Each shift and sign term is thus represented by B+2 bits width.

Note that although the description has been made with reference to the CSD representation, also binary signals may be used as the multiplier. However, the range of possible multiplier values which can be represented by the L shift and sign terms will then be smaller. Also, the sign flag will always be set to a value which prevents the 2's complement to be output from the multiplexer. Still further, any of the MSD representations (i.e. MSD as well as CSD) can be used if there is any benefit resulting therefrom.

FIG. 4 shows the storage for the shift and sign terms in a general manner. In a possible implementation, the storage may be realized by a series of D-flip-flop based registers, each flip-flop based register storing one shift and sign term. Nevertheless, any means that makes it possible to store the shift and sign terms and load them out with a frequency of CLK is applicable for this purpose. More precisely, this can be realized for example with a parallel-in serial-out type storage element with L term inputs and one term output. An input rate in such a case is CLK/L and an output rate is CLK. Such a kind of operation can be realized in several ways, each of which involving basically a set of registers and some control logic.

The storage for the shift and sign terms is controlled by a clock signal CLK. Thus, a multiplier represented by L shift and sign terms can serially processed after L clock cycles. Also, each intermediate addition result is fed back to the adder means with the same clock cycle, i.e. synchronously to a new shift and sign term being supplied to the shifting means BWS. However, since a multiplicand to be multiplied by the multiplier has to be present during the L clock cycles, the multiplicand is supplied to the multiplier L times more slowly, and also the final multiplication result is read out L times more slowly, which is the reason for the first and second flip-flop shown in FIG. 4 being controlled by a signal CLK/L.

Although not expressly mentioned above, it is to be understood that the flip-flop based registers, multiplexer, the adder and so on, each are adapted in terms of their bit width to process a signal X of n bit. Also, the adder copes with carry bits sometimes generated in the course of additions for multiplication. Still further, a multiple bit signal generally is a signal of multiple digits.

Thus, as has been described herein above, FIG. 4 shows a multiplier device, for multiplying a multiplicand (X) by a multiplier represented by multiple digits, the multiplier device comprising a storage for storing a number (L) of pieces of information corresponding to the multiple digits of the multiplier; a shifting (BWS) for shifting the multiplicand based on a piece of information in said storage means, and an adder (+), wherein pieces of information in the storage are sequentially read out and applied as a control signal to the shifter, and an output of the shifter (BWS) is added by the adder to an output of the adder obtained previously.

Figure 5:
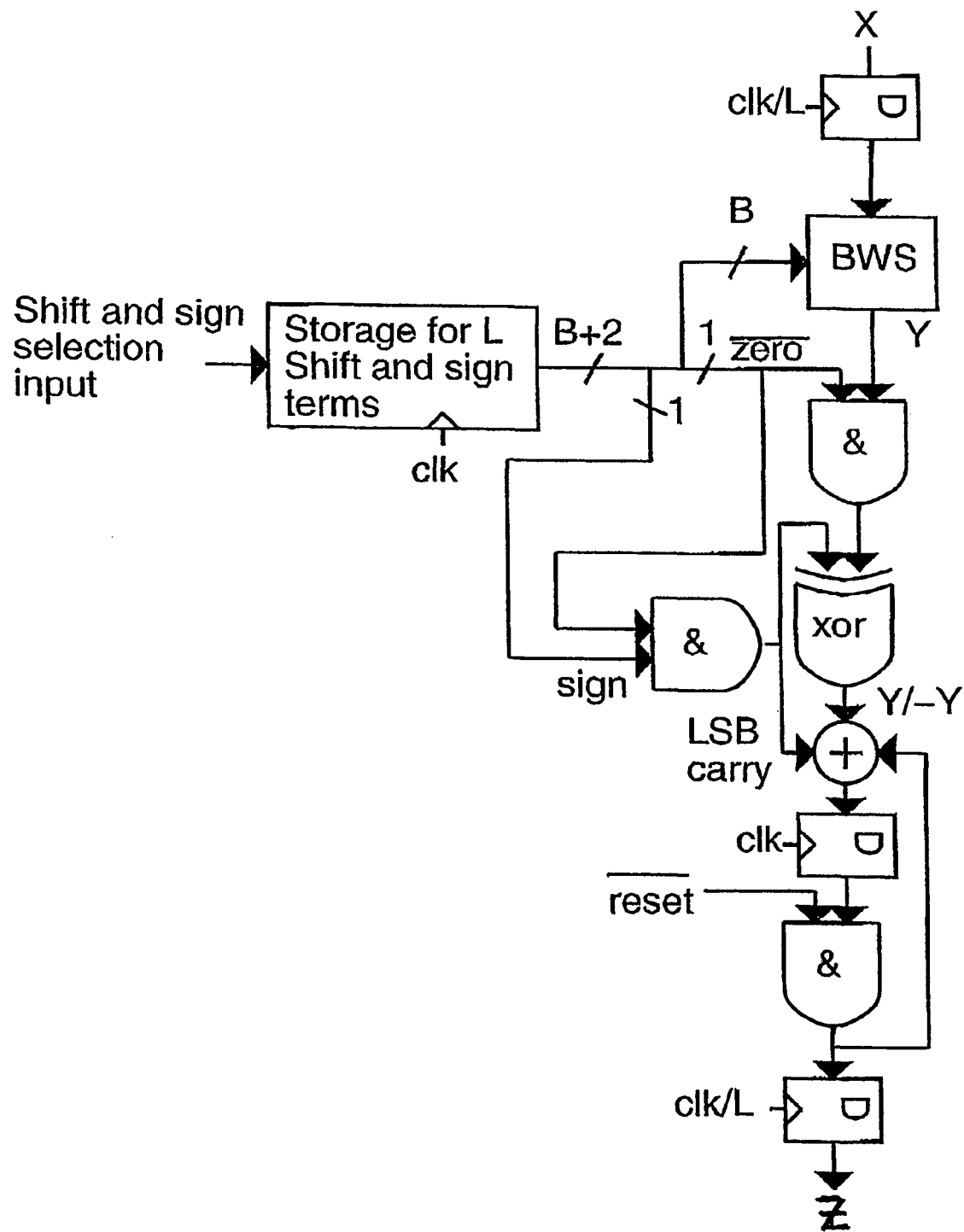
FIG. 5 shows a modified multiplier device according to the present invention.

FIG. 5 shows a modified multiplier device according to the present invention. As only the negation operation, i.e. the deriving of the 2's complement of the multiplicand, has been changed in this modification, only those changes are described in greater detail. The remaining circuit arrangement is similar to the one shown in FIG. 4, such that a repeated description thereof is omitted.

As illustrated in FIG. 5, the shifted value of X (value Y) is fed to the AND gate controlled by the inverted zero-flag. If the zero-flag is zero, the inverted zero-flag is one and the output of the AND gate is equivalent to Y. If the zero-flag is one (meaning that there is a digit of the multiplier of a value of zero), the output of the AND gate is zero.

The inverted zero-flag is also supplied to another AND gate to which the sign information (sign flag) is fed. Similarly, if the zero is indicated (zero-flag is set to "1", inverted zero-flag is "0") the output of this AND gate is zero, while if zero is not indicated, the output corresponds to the sign information represented by the sign-flag. In the case that the zero is not indicated (inverted zero-flag is one) and the sign bit is one, the exclusive-or gate (XOR) inverts all bits that are supplied thereto from the upstream AND gate to which the Y signal is supplied. The sign bit is also fed to the carry input of the LSB position of the adder means, thus performing addition of "1". Consequently, if the sign-bit is "1" the 2's complement negation of Y is performed (yielding "−Y"), whereas if the sign bit is "0", no negation occurs (yielding With this modification, the multiplier device can be made more simple in terms of the hardware arrangement as at least one multiplexer can be saved.

Although the present invention herein above has been described with reference to particular embodiments as illustrated in the drawings, the present invention is not limited thereto. It should be understood that numerous modifications may be made thereto without departing from the spirit and scope of the invention. It is intended that all such modifications fall within the scope of the appended claims.

Thus, as has been described herein above, the present invention is a multiplier device performing multiplication of different powers of two serially in time (not in parallel) in order to further reduce the area needed for a hardware realization. By virtue thereof, it is enabled to use only one adder in connection with the multiplication which contributes to a reduced hardware amount and reduced required area for the hardware. A shifter based on binary weighted shifting is used for shifting in connection with the multiplication, thereby reducing the required hardware amount (number of multiplexers and hardwired shifting elements) and thus reducing the area for hardware implementation still further. The present invention can be used in applications using digital multiplication, such as in digital signal processing DSP, digital filters and/or finite impulse response filters FIR filters as well as programmable and/or adaptive digital filters. As the multiplier is represented in CSD coding, the number of necessary shifting operations can be reduced and the number of necessary additions can be reduced, thus contributing to a reduced area needed for a hardware realization of a shifter and a multiplier device on a silicon chip.

What is claimed is:

1. A multiplier device, for multiplying a multiplicand by a multiplier represented by multiple canonic signed digits, comprising:
    a storage for storing a number of pieces of information corresponding to the multiple canonic signed digits of the multiplier wherein each of the number of pieces of information stored in the storage includes a shift control signal of B bits width which represents the value of a significance of a concerned digit of multiplier, a sign-flag indicating whether the concerned digit of the multiplier has a value of +1 or −1, and a zero flag indicating whether the concerned digit of the multiplier has a value of zero or not;
    a shifter for shifting the multiplicand based on the shift control signal;
    and an adder and wherein;
    an output of the shifter is added by the adder to an output of the adder obtained previously, wherein the pieces of information in the storage are sequentially read out, and wherein the sign-flag and the zero-flag are supplied as control signals to a signal processor which outputs a 2's complement of the multiplicand.

2. A multiplier device according to claim 1, wherein the signal processing means comprises:
    a multiplexer, supplied with the multiplicand and the 2's complement of the multiplicand, and an AND-gate, supplied with the zero-flag and the output of the multiplexer, and supplying output thereof to the shifter, and wherein
    the sign-flag controls the multiplexer to output the multiplicand or the 2's complement of the multiplicand.

3. A multiplier device according to claim 1, wherein the signal processor comprises:
    an AND-gate supplied with the zero-flag and an output of the shifter, and an XOR-ate, supplied with the output of the AND-gate and a logical AND of the sign-flag and the zero-flag, and supplying the output thereof to the adder.

4. A multiplier device according to claim 1, wherein:
    the number of pieces of information corresponds to a number of digits of the multiplier.

5. A multiplier device according to claim 1, wherein:
    the number of pieces of information corresponds to a number of non-zero digits of the multiplier in CSD a representation.

6. A multiplier device according to claim 1, wherein the shifter for shifting shifts a multiple digit input signal by a number of digits selectable in a range from zero to $2^B-1$, and comprises:
    a plurality of B shifting stages, each shifting stage comprising a multiplexer element controlled by an i-th component of a shifting amount control signal having a total of B components, for outputting, depending on a value of the i-th component of the shifting amount control signal, either a signal supplied directly to the multiplexer from a multiplexer of an (i−1)-th shifting stage, or a signal supplied to the multiplexer from a multiplexer of an (i−1)-th shifting stage via an i-th shifting element subjecting the signal supplied thereto to a shifting by $2^{i-1}$ digits.

* * * * *